United States Patent
Kwon et al.

(10) Patent No.: US 9,413,030 B2
(45) Date of Patent: *Aug. 9, 2016

(54) CABLE-TYPE SECONDARY BATTERY
(71) Applicant: LG Chem, Ltd., Seoul (KR)
(72) Inventors: Yo-Han Kwon, Daejeon (KR); Hyo-Mi Kim, Daejeon (KR); Je-Young Kim, Daejeon (KR); Hye-Ran Jung, Daejeon (KR)
(73) Assignee: LG Chem, Ltd. (KR)
( * ) Notice: Subject to any disclaimer, the term of this patent is extended or adjusted under 35 U.S.C. 154(b) by 0 days.

This patent is subject to a terminal disclaimer.

(21) Appl. No.: 14/925,188
(22) Filed: Oct. 28, 2015
(65) Prior Publication Data

US 2016/0049686 A1   Feb. 18, 2016

Related U.S. Application Data

(63) Continuation of application No. 14/257,228, filed on Apr. 21, 2014, now Pat. No. 9,184,470, which is a continuation of application No. PCT/KR2013/009121, filed on Oct. 11, 2013.

(30) Foreign Application Priority Data

Oct. 11, 2012 (KR) .................. 10-2012-0113161
Oct. 11, 2013 (KR) .................. 10-2013-0121487

(51) Int. Cl.
*H01M 10/04* (2006.01)
*H01M 10/0525* (2010.01)
(Continued)

(52) U.S. Cl.
CPC ............ *H01M 10/0431* (2013.01); *H01M 2/18* (2013.01); *H01M 4/13* (2013.01);
(Continued)

(58) Field of Classification Search
CPC ....... H01M 2/1606; H01M 2/18; H01M 4/75; H01M 4/13; H01M 4/131; H01M 4/133; H01M 4/134; H01M 4/136; H01M 4/661–4/663; H01M 4/666; H01M 4/668; H01M 4/669; H01M 4/765; H01M 10/0431; H01M 10/0587; H01M 10/0525; H01M 2300/0025; H01M 2300/0085; H01M 2220/20; H01M 2220/30; Y02E 60/122

See application file for complete search history.

(56) References Cited

U.S. PATENT DOCUMENTS

| 5,300,371 A | 4/1994 | Tomantschger et al. |
| 2006/0222943 A1 | 10/2006 | Fujikawa et al. |

(Continued)

FOREIGN PATENT DOCUMENTS

| CN | 1109641 A | 10/1995 |
| JP | H2-143779 A | 12/1990 |

(Continued)

OTHER PUBLICATIONS

Kwon, Y.H., et al. "Cable-Type Flexible Lithium Ion Battery Based on Hollow Multi-Helix Electrodes", Advanced Materials, vol. 24, pp. 5192-5197, published Aug. 7, 2012.*

(Continued)

*Primary Examiner* — Carlos Barcena
*Assistant Examiner* — Lilia V Nedialkova
(74) *Attorney, Agent, or Firm* — Lerner, David, Littenberg, Krumholz & Mentlik, LLP

(57) ABSTRACT

Provided is a cable-type secondary battery extending longitudinally including a lithium ion supplying core comprising an electrolyte, an inner electrode support of a hollow structure formed to surround an outer surface of the lithium ion supplying core, an inner electrode formed on a surface of the inner electrode support and including an inner current collector and an inner electrode active material, a separation layer formed to surround an outer surface of the inner electrode to prevent a short circuit between electrodes, and an outer electrode formed to surround an outer surface of the separation layer and including an outer electrode active material layer and an outer current collector.

36 Claims, 4 Drawing Sheets

(51) Int. Cl.

| | |
|---|---|
| *H01M 10/0587* | (2010.01) |
| *H01M 2/18* | (2006.01) |
| *H01M 4/13* | (2010.01) |
| *H01M 4/76* | (2006.01) |
| *H01M 4/75* | (2006.01) |
| *H01M 2/16* | (2006.01) |
| *H01M 4/131* | (2010.01) |
| *H01M 4/133* | (2010.01) |
| *H01M 4/134* | (2010.01) |
| *H01M 4/136* | (2010.01) |
| *H01M 4/66* | (2006.01) |

(52) U.S. Cl.
CPC ......... *H01M 4/765* (2013.01); *H01M 10/0525* (2013.01); *H01M 10/0587* (2013.01); *H01M 2/1606* (2013.01); *H01M 4/131* (2013.01); *H01M 4/133* (2013.01); *H01M 4/134* (2013.01); *H01M 4/136* (2013.01); *H01M 4/661* (2013.01); *H01M 4/662* (2013.01); *H01M 4/663* (2013.01); *H01M 4/666* (2013.01); *H01M 4/668* (2013.01); *H01M 4/669* (2013.01); *H01M 4/75* (2013.01); *H01M 2220/20* (2013.01); *H01M 2220/30* (2013.01); *H01M 2300/0025* (2013.01); *H01M 2300/0085* (2013.01); *Y02E 60/122* (2013.01)

(56) References Cited

U.S. PATENT DOCUMENTS

| | | | |
|---|---|---|---|
| 2010/0203372 | A1 | 8/2010 | Kim et al. |
| 2010/0261047 | A1 | 10/2010 | Kim et al. |
| 2011/0033751 | A1 | 2/2011 | Fujita et al. |
| 2011/0117414 | A1 | 5/2011 | Choi et al. |
| 2011/0143189 | A1 | 6/2011 | Kim et al. |
| 2011/0318600 | A1 | 12/2011 | Matsunaga et al. |
| 2012/0015233 | A1 | 1/2012 | Kwon et al. |
| 2012/0058376 | A1 | 3/2012 | Kwon et al. |
| 2012/0148902 | A1 | 6/2012 | Kwon et al. |
| 2012/0174386 | A1 | 7/2012 | Katayama et al. |
| 2012/0295144 | A1 | 11/2012 | Kwon et al. |

FOREIGN PATENT DOCUMENTS

| | | |
|---|---|---|
| JP | 09007629 | 1/1997 |
| JP | 2001110445 A | 4/2001 |
| KR | 20070009231 A | 1/2007 |
| KR | 20090009598 | 1/2009 |
| KR | 20110089583 A | 8/2011 |
| KR | 20110127972 A | 11/2011 |
| KR | 20120000744 A | 1/2012 |
| KR | 20130040161 A | 4/2013 |
| WO | 2011093661 A2 | 8/2011 |

OTHER PUBLICATIONS

International Search report for PCT/KR2013/009121 mailed Feb. 7, 2014.

Written Opinion of the International Searching Authority for PCT/KR2013/009121 mailed Feb. 7, 2014.

Machine translation of Japanese Patent Publication No. 09-007629A, published Jan. 1997.

Machine translation of Japanese Patent Publication No. 2001110445A, published Apr. 2001.

Machine translation of Korean Patent Publication No. 2007009231 A, published Jan. 2007.

* cited by examiner

CABLE-TYPE SECONDARY BATTERY

CROSS-REFERENCE TO RELATED APPLICATION

The present application is a continuation of U.S. application Ser. No. 14/257,228 filed Apr. 21, 2014, now U.S. Pat. No. 9,184,470, which is a continuation of International Application No. PCT/KR2013/009121 filed on Oct. 11, 2013, which claims priority to Korean Patent Application No. 10-2012-0113161 filed in the Republic of Korea on Oct. 11, 2012 and Korean Patent Application No. 10-2013-0121487 filed in the Republic of Korea on Oct. 11, 2013, the disclosures of which are incorporated herein by reference.

TECHNICAL FIELD

The present disclosure relates to a cable-type secondary battery which can freely change in shape, and more particularly, to a cable-type secondary battery including an inner electrode support of a hollow structure receiving a lithium ion supplying core therein.

BACKGROUND ART

A secondary battery is a device that stores electrical energy in chemical form and converts the stored chemical energy into electrical energy to generate electricity when needed. The secondary battery is also referred to as a rechargeable battery because it can be recharged repeatedly. A common secondary battery includes a lead accumulator, a NiCd battery, a NiMH accumulator, a Li-ion battery, a Li-ion polymer battery, and the like. When compared to a disposable primary battery, not only is the secondary battery more economically efficient, it is also more environmentally friendly.

A secondary battery is currently used in applications requiring low electric power, for example, equipment to start a vehicle, a mobile device, a tool, an uninterruptible power supply, and the like. Recently, as the development of wireless communication technologies has been leading to the popularization of mobile devices and even to the mobilization of many kinds of conventional devices, the demand for a secondary battery has been dramatically increasing. A secondary battery is also used in an environmentally friendly next-generation vehicle such as a hybrid vehicle or an electric vehicle to reduce the cost and weight and to increase the service life of the vehicle.

Generally, most secondary batteries have a cylindrical, prismatic, or pouch shape. This is associated with a fabrication process of a secondary battery that mounts an electrode assembly composed of an anode, a cathode, and a separator in a cylindrical or prismatic metal casing or a pouch-shaped casing of an aluminum laminate sheet, and injects an electrolyte into the electrode assembly. Because a predetermined mounting space for the electrode assembly is necessary in this process, the cylindrical, prismatic or pouch shape of the secondary battery is a limitation in developing various shapes of mobile devices. Accordingly, there is a need for a new type of secondary battery that is easily adaptable in shape.

To fulfill this need, suggestions have been made to develop a linear battery having a very high ratio of length to cross-sectional diameter. Korean Patent Application publication No. 2005-99903 discloses an adaptable battery consisting of an inner electrode, an outer electrode and an electrolyte layer interposed therebetween. However, such battery has poor flexibility. The linear battery uses a polymer electrolyte to form an electrolyte layer, but this causes difficulties in the inflow of the electrolyte into an electrode active material, thereby increasing the resistance of the battery and deteriorating the capacity and cycle characteristics thereof.

DISCLOSURE

Technical Problem

Therefore, it is an object of the present disclosure to provide a secondary battery having a new linear structure, which can easily change in shape, maintain excellent stability and performances as a secondary battery, and facilitate the inflow of an electrolyte into an electrode active material.

Technical Solution

To achieve the above object, the present disclosure provides a cable-type secondary battery extending longitudinally including a lithium ion supplying core comprising an electrolyte, an inner electrode support of a hollow structure formed to surround an outer surface of the lithium ion supplying core, an inner electrode formed on a surface of the inner electrode support and including an inner current collector and an inner electrode active material layer, a separation layer formed to surround an outer surface of the inner electrode to prevent a short circuit between electrodes, and an outer electrode formed to surround an outer surface of the separation layer and including an outer electrode active material layer and an outer current collector.

The inner electrode support of the hollow structure may be a hollow fiber.

The inner electrode support of the hollow structure may have a pore on the surface to allow the electrolyte to move to an inner electrode active material and an outer electrode active material.

The pore may have a diameter in a range of 10 nm to 100 µm.

The hollow fiber may be formed from at least one selected from the group consisting of polyethylene, polypropylene, polytetrafluoroethylene, polyvinylidenefluoride, polyimide, polyethyleneterephthalate, polyamide-imide, polyesterimide, polyethersulfone, and polysulfone.

As the inner current collector, a wound wire-type current collector, a wound sheet-type current collector, or a metal coating layer may be used.

The inner electrode may include the inner electrode active material layer formed to surround the outer surface of the inner electrode support and the inner current collector formed to surround the outer surface of the inner electrode active material layer, or the inner electrode may include the inner current collector formed to surround the outer surface of the inner electrode support and the inner electrode active material layer formed to surround the outer surface of the inner current collector.

The outer electrode may include the outer electrode active material layer formed to surround the outer surface of the separation layer and the outer current collector formed to surround the outer surface of the outer electrode active material layer, the outer electrode may include the outer current collector formed to surround the outer surface of the separation layer and the outer electrode active material layer formed to surround the outer surface of the outer current collector, the outer electrode may include the outer current collector formed to surround the outer surface of the separation layer and the outer electrode active material layer formed to surround the outer surface of the outer current collector and to come into contact with the separation layer, or the outer electrode may include the outer electrode active material layer formed to surround the outer surface of the separation layer and the wire-type outer current collector formed to be included inside the outer electrode active material layer by being covered therein and to surround the outer surface of the separation layer with spacing apart therefrom.

Also, there is no special limitation on a shape of the outer current collector, but it is preferred to use a pipe-type current collector, a wound wire-type current collector, a wound sheet-type current collector, or a mesh-type current collector.

The inner current collector is not limited to a specific type, but may include an inner current collector made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

As the conductive material, polyacetylene, polyaniline, polypyrrole, polythiophene, polysulfurnitride, indium tin oxide (ITO), silver, palladium, and nickel may be used, and the conductive polymer may be a polymer of any one compound selected from polyacetylene, polyaniline, polypyrrole, polythiophene, and polysulfurnitride, or mixtures thereof.

The outer current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Al, Pd/Ag, Cr, Ta, Cu, Ba or ITO; or a carbon paste comprising carbon powders of graphite, carbon black or carbon nanotube.

The lithium ion supplying core of the present disclosure comprises the electrolyte, and the electrolyte is not limited to a specific type but may use an electrolyte selected from a non-aqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP); and a gel-type polymer electrolyte using polyethylene oxide (PEO), polyvinylidene fluoride (PVdF), polymethylmethacrylate (PMMA), polyacrylonitrile (PAN), or polyvinyl acetate (PVAc); or a solid electrolyte using PEO, polypropylene oxide (PPO), polyethylene imine (PEI), polyethylene sulphide (PES), or polyvinyl acetate (PVAc). Also, the electrolyte may further comprise a lithium salt, and it is preferred to use, as the lithium salt, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, and lithium tetraphenylborate.

The inner electrode of the present disclosure may be an anode or a cathode, and the outer electrode may be a cathode or an anode, opposite to the inner electrode.

Also, when the inner electrode is an anode and the outer electrode is a cathode, the inner electrode active material layer may be an anode active material layer including particles of any one active material selected from the group consisting of natural graphite, artificial graphite, or a carbonaceous material; lithium-containing titanium composite oxide (LTO; lithium titanium oxide), and metals (Me) including Si, Sn, Li, Zn, Mg, Cd, Ce, Ni and Fe; alloys of the metals (Me); oxides (MeOx) of the metals (Me); and composites of the metals (Me) and carbon, or mixtures thereof, and the outer electrode active material layer may be a cathode active material layer including particles of any one active material selected from the group consisting of LiCoO$_2$, LiNiO$_2$, LiMn$_2$O$_4$, LiCoPO$_4$, LiFePO$_4$, LiNiMnCoO$_2$, and LiNi$_{1-x-y-z}$Co$_x$M1$_y$M2$_z$O$_2$ (wherein each of M1 and M2 is, independently, any one selected from the group consisting of Al, Ni, Co, Fe, Mn, V, Cr, Ti, W, Ta, Mg and Mo, and x, y and z are, independently, atomic fractions of elements in an oxide composition, in which $0 \le x \le 0.5$, $0 \le y \le 0.5$, $0 \le z < 0.5$, and $x+y+z \le 1$), or mixtures thereof.

Also, when the inner electrode is a cathode and the outer electrode is an anode, the inner electrode active material layer may be a cathode active material layer including particles of any one active material selected from the group consisting of LiCoO$_2$, LiNiO$_2$, LiMn$_2$O$_4$, LiCoPO$_4$, LiFePO$_4$, LiNiMnCoO$_2$, and LiNi$_{1-x-y-z}$Co$_x$M1$_y$M2$_z$O$_2$ (wherein each of M1 and M2 is, independently, any one selected from the group consisting of Al, Ni, Co, Fe, Mn, V, Cr, Ti, W, Ta, Mg and Mo, and x, y and z are, independently, atomic fractions of elements in an oxide composition, in which $0 \le x \le 0.5$, $0 \le y < 0.5$, $0 \le z < 0.5$, and $x+y+z \le 1$), or mixtures thereof, and the outer electrode active material layer may be an anode active material layer including particles of any one active material selected from the group consisting of natural graphite, artificial graphite, or a carbonaceous material; lithium-containing titanium composite oxide (LTO), and metals (Me) including Si, Sn, Li, Zn, Mg, Cd, Ce, Ni and Fe; alloys of the metals (Me); oxides (MeOx) of the metals (Me); and composites of the metals (Me) and carbon, or mixtures thereof, however the present disclosure is not limited thereto.

The separation layer of the present disclosure may use an electrolyte layer or a separator.

The electrolyte layer is not limited to a specific type, but it is preferred to use a gel-type polymer electrolyte using PEO, PVdF, PMMA, PAN, or PVAc; or a solid electrolyte using PEO, polypropylene oxide (PPO), polyethylene imine (PEI), polyethylene sulphide (PES), or polyvinyl acetate (PVAc). Also, the electrolyte layer may further comprise a lithium salt, and a non-limiting example of the lithium salt may include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, and lithium tetraphenylborate.

When a separator is used as the separation layer, the cable-type secondary battery of the present disclosure requires an electrolyte, and the separator is not limited to a specific type, but may use a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer.

The cable-type secondary battery may further include an electrolyte absorption layer between the inner electrode and the separation layer.

Also, the cable-type secondary battery may further include a first electrolyte absorption layer between the inner electrode and the separation layer, and a second electrolyte absorption layer between the separation layer and the outer electrode.

The wire-type current collector may have a structure of at least two wires that are spirally twisted around each other.

The cable-type secondary battery may have a cross section of a circular or polygonal shape.

Also, the present disclosure provides a cable-type secondary battery including a plurality of inner electrodes, and also provides a cable-type secondary battery including a plurality of inner electrodes having separation layers.

Advantageous Effects

In accordance with the present disclosure, a lithium ion supplying core comprising an electrolyte is disposed within an inner electrode support, and the inner electrode support has a hollow structure, so the electrolyte of the lithium ion supplying core can be easily penetrated into an electrode active material, thereby facilitating the supply and exchange of lithium ions. Accordingly, the cable-type secondary battery of the present disclosure has such a lithium ion supplying core to exhibit superior capacity and cycle characteristics of the battery. Also, the cable-type secondary battery of the present disclosure may further improve flexibility due to having the inner electrode support of the hollow structure.

DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

MODE FOR DISCLOSURE

Hereinafter, the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Figure 1:
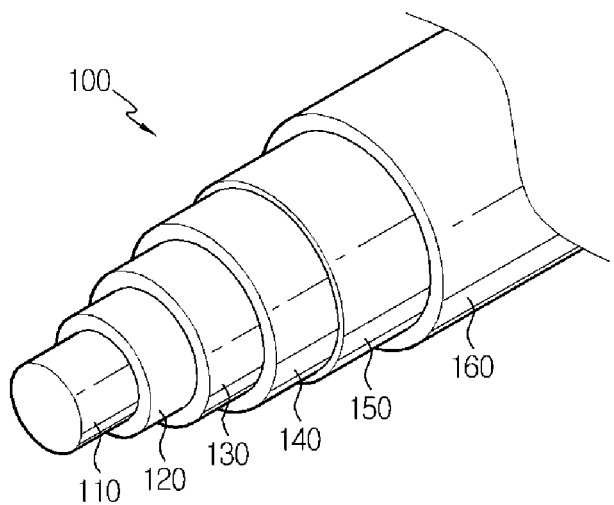
FIG. 1 is a view illustrating a cable-type secondary battery according to an exemplary embodiment of the present disclosure.

In FIG. 1, an example of a cable-type secondary battery according to the present disclosure is schematically illustrated. However, the configurations illustrated in the drawings and the embodiments are just preferable examples for the purpose of illustrations only, not intended to limit the scope of the disclosure, so it should be understood that other equivalents and modifications could be made thereto without departing from the spirit and scope of the disclosure.

The cable-type secondary battery 100 of the present disclosure that extends longitudinally includes a lithium ion supplying core 110 comprising an electrolyte; an inner electrode support 120 of a hollow structure formed to surround the outer surface of the lithium ion supplying core 110 and an inner electrode 130 formed on the surface of the inner electrode support 120 and including an inner electrode active material layer and an inner current collector; a separation layer 140 formed to surround the outer surface of the inner electrode to prevent a short circuit between electrodes; and an outer electrode 150 formed to surround the outer surface of the separation layer 140 and including an outer electrode active material layer and an outer current collector.

In this instance, the inner electrode support of the hollow structure may employ any type if it has a hollow structure capable of receiving the electrolyte of the lithium ion supplying core 110 and has a pore formed on the surface to allow the electrolyte to freely move to the inner electrode active material and the outer electrode active material to ensure a wetting performance.

The inner electrode support of the hollow structure may include, for example, but is not limited to, a hollow fiber.

The hollow fiber may be obtained by a conventional method of forming a hollow fiber, using at least one polymer selected from the group consisting of polyethylene, polypropylene, polytetrafluoroethylene, polyvinylidenefluoride, polyimide, polyethyleneterephthalate, polyamide-imide, polyesterimide, polyethersulfone, and polysulfone.

The inner electrode support may have a diameter in a range of 0.5 to 10 mm, and may have a pore of a diameter in a range of 10 nm to 100 μm on the surface thereof.

Also, a cross section of the cable-type secondary battery according to an exemplary embodiment of the present disclosure is not limited to a particular shape, and may have any shape that does not damage the nature of the present disclosure. For example, the cross section of the cable-type secondary battery may have a circular shape or a polygonal shape, and the circular shape may correspond to a circular structure of geometrically perfect symmetry and an asymmetrical oval structure. The polygonal shape is not limited to a particular structure unless such structure is in a shape of a two-dimensional sheet, and the polygonal structure may be, as a non-limiting example, a triangle, a square, a pentagon, or a hexagon.

The cable-type secondary battery of the present disclosure has a horizontal cross section of the exemplary shape described in the foregoing, and has a linear structure elongating in a longitudinal direction with regard to the horizontal cross section as well as flexibility, so it can freely change in shape.

Conventional cable-type secondary batteries have an electrolyte layer interposed between an inner electrode and an outer electrode. In order for the electrolyte layer to isolate the inner electrode from the outer electrode to prevent a short circuit, the electrolyte layer is required to be made of a gel-type polymer electrolyte or a solid polymer electrolyte having a certain degree of mechanical properties. However, such a gel-type polymer electrolyte or solid polymer electrolyte fails to provide superior performances as a source for lithium ions, so the electrolyte layer should have an increased thickness so as to sufficiently provide lithium ions to an electrode active material layer. Such a thickness increase in the electrolyte layer widens an interval between the electrodes to cause resistance increase, thereby deteriorating battery performances.

In contrast, the cable-type secondary battery 100 of the present disclosure has the lithium ion supplying core 110 comprising the electrolyte, the inner electrode support of the present disclosure has a hollow structure, and the inner current collector of an open structure and the inner electrode active material layer are applied to the inner electrode, so that the electrolyte of the lithium ion supplying core 110 can pass through the inner electrode support to reach the inner current collector, the inner electrode active material layer 130 and the outer electrode active material layer.

Here, the open structure refers to a structure in which the open structure serves as a boundary surface through which a substance may be transferred freely from the inside of the structure to the outside thereof Accordingly, it is not necessary to excessively increase the thickness of an electrolyte layer. Also, an electrolyte layer may not be adopted as an essential component, and therefore, only a separator may be optionally used. That is, since the cable-type secondary battery according to an exemplary embodiment of the present disclosure has a lithium ion supplying core 110 comprising the electrolyte, it may facilitate the penetration into an electrode active material, and eventually facilitate the supply and exchange of lithium ions in electrodes, thereby exhibiting superior capacity and cycle characteristics of the battery.

The lithium ion supplying core 110 comprises the electrolyte, and the electrolyte is not limited to a specific type, but may use a non-aqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA), or methyl propionate (MP); a gel-type polymer electrolyte using PEO, PVdF, PMMA, PAN, or PVAc; or a solid electrolyte using PEO, polypropylene oxide (PPO), polyethylene imine (PEI), polyethylene sulphide (PES), or polyvinyl acetate (PVAc). Also, the electrolyte may further comprise a lithium salt, and preferred examples of the lithium salt include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and the like. Also, the lithium ion supplying core 110 may consist of only an electrolyte, and in the case of a liquid electrolyte, a porous carrier may be used together.

The inner electrode 130 of the present disclosure may include the inner electrode active material layer formed to surround the outer surface of the inner electrode support and the inner current collector formed to surround the outer surface of the inner electrode active material layer, or may include the inner current collector formed to surround the outer surface of the inner electrode support and the inner electrode active material layer formed to surround the outer surface of the inner current collector. The inner current collector may use, as a non-limiting example, a wound wire-type current collector, a wound sheet-type current collector, or a metal coating layer.

Specifically, in the inner electrode according to an exemplary embodiment of the present disclosure, the inner current collector may be formed on the inner electrode support of the hollow structure, and subsequently, the inner electrode active material layer may be formed on the surface of the inner current collector. In this instance, the inner electrode active material layer may be formed to surround the outer surface of the inner current collector such that the open structure of the inner current collector may not be exposed through the outer surface of the inner electrode active material layer, and the inner electrode active material layer may be formed on the surface of the open structure of the inner current collector such that the open structure of the inner current collector may be exposed through the outer surface of the inner electrode active material layer. For example, a case in which an active material layer is formed on a surface of a wound wire-type current collector, and a case in which a wire-type current collector having an electrode active material layer formed thereon is wound and used may be contemplated.

Also, in the inner electrode according to an exemplary embodiment of the present disclosure, the inner electrode active material layer may be first formed on the inner electrode support of the hollow structure, and subsequently, the inner current collector may be formed on the surface of the inner electrode active material layer. In this case, the inner electrode active material layer and the inner current collector may be formed to implement an inner electrode of an open structure such that pores of the inner electrode of the hollow structure are not blocked. In this instance, when a metal coating layer is applied as the inner current collector, for example, an electroplating method may be used.

The inner current collector may be manufactured using stainless steel, aluminum, nickel, titanium, sintered carbon, copper, stainless steel treated with carbon, nickel, titanium or silver on the surface thereof, an aluminum-cadmium alloy, a non-conductive polymer treated with a conductive material on the surface thereof, or a conductive polymer.

A current collector serves to collect electrons generated by an electrochemical reaction of an active material or to supply electrons required for an electrochemical reaction. In general, a metal such as copper or aluminum is used. Especially, a current collector using a non-conductive polymer treated with a conductive material on the surface thereof or a conductive material comprising a conductive polymer has a relatively better flexibility than a current collector using a metal such as copper or aluminum. Also, a lightweight battery may be achieved by replacing a metal current collector with a polymer current collector.

The conductive material may include polyacetylene, polyaniline, polypyrrole, polythiophene, polysulfurnitride, indium tin oxide (ITO), silver, palladium, nickel, and the like. The conductive polymer may include polyacetylene, polyaniline, polypyrrole, polythiophene, polysulfurnitride, and the like. However, the non-conductive polymer used for the current collector is not limited to a specific type.

The outer current collector of the present disclosure is not limited to a specific type, but may use a pipe-type current collector, a wound wire-type current collector, a wound sheet-type current collector, or a mesh-type current collector. Also, the outer current collector may be manufactured using stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Pd/Ag, Cr, Ta, Cu, Ba or ITO; or a carbon paste comprising carbon powders of graphite, carbon black or carbon nanotube.

The inner electrode may be an anode or a cathode, and the outer electrode may be a cathode or an anode, opposite to the inner electrode.

The electrode active material layer of the present disclosure allows ions to move through the current collector, and the movement of the ions is caused by the interaction through intercalation/deintercalation of the ions into and from the electrolyte layer.

The electrode active material layer may be classified into an anode active material layer and a cathode active material layer.

Specifically, when the inner electrode is an anode and the outer electrode is a cathode, the inner electrode active material layer is an anode active material layer and may include particles of any one active material selected from the group consisting of natural graphite, artificial graphite, or carbonaceous materials; lithium-containing titanium composite oxide (LTO; lithium titanium oxide), and metals (Me) such as Si, Sn, Li, Zn, Mg, Cd, Ce, Ni, or Fe; alloys consisted of the metals (Me); oxides (MeOx) of the metals (Me); and composites of the metals (Me) and carbon, or mixtures thereof, and the outer electrode active material layer is a cathode active material layer and may include particles of any one active material selected from the group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$ (wherein each of M1 and M2 is, independently, any one selected from the group consisting of Al, Ni, Co, Fe, Mn, V, Cr, Ti, W, Ta, Mg, and Mo, and x, y, and z are, independently, atomic fractions of elements in an oxide composition, in which $0 \leq x < 0.5$, $0 \leq y \leq 0.5$, $0 \leq z \leq 0.5$, and $x+y+z \leq 1$), or mixtures thereof.

Also, when the inner electrode is a cathode and the outer electrode is an anode, the inner electrode active material layer may be a cathode active material layer and the outer electrode active material layer may be an anode active material layer.

As described in the foregoing, the outer electrode may include the outer electrode 150 formed to surround the outer surface of the separation layer 140, and including the outer electrode active material layer and the outer current collector, as shown in FIG. 1.

In this instance, the outer electrode 150 may be variously implemented based on the placement of the outer electrode active material layer and the outer current collector in contact with the separation layer.

For example, the outer electrode 150 may have a structure including the outer electrode active material layer formed to surround the outer surface of the separation layer 140 and the outer current collector formed to surround the outer surface of the outer electrode active material layer, a structure including the outer current collector formed to surround the outer surface of the separation layer and the outer electrode active material layer formed to surround the outer surface of the outer current collector, a structure including the outer current collector formed to surround the outer surface of the separation layer and the outer electrode active material layer formed to surround the outer surface of the outer current collector and to come into contact with the separation layer, or a structure including the outer electrode active material layer formed to surround the outer surface of the separation layer and the wire-type outer current collector formed to be included inside the outer electrode active material layer by being covered therein and to surround the outer surface of the separation layer with spacing apart therefrom.

In this instance, when the outer current collector is wound on the outer surface of the separation layer, a contact area with the active material layer sufficiently increases to ensure a certain degree of battery performances. Particularly, since the outer electrode active material layer according to an exemplary embodiment of the present disclosure is formed by coating an active material, for example, in the form of a slurry on the outer surface of the outer current collector, the outer electrode active material layer may come into contact with the separation layer. Also, the outer current collector may be included inside the outer electrode active material layer by being covered therein, while surrounding the outer surface of the separation layer with spacing apart therefrom by the outer electrode active material layer. As a result, an electric contact between the outer current collector and the outer electrode active material layer may be improved, thereby contributing to the enhancement of battery characteristics.

For example, when a wound wire-type outer current collector having flexibility is used as the outer current collector, the wound wire-type outer current collector has elasticity due to its shape and serves to enhance the overall flexibility of the cable-type secondary battery. Also, when excessive external force is applied to the cable-type secondary battery of the present disclosure, the wire-type outer current collector of the present disclosure undergoes very little excessive deformation such as crumpling or bending due to its shape characteristics, so concerns about a short circuit caused by a contact with the inner current collector may be reduced.

The electrode active material layer includes an electrode active material, a binder and a conductive material, and combines with the current collector to form the electrode. When the electrode is deformed by bending or severely folding due to external force, the electrode active material may be released. The release of the electrode active material results in performance deterioration and capacity reduction of the battery. However, the wound wire-type outer current collector having elasticity functions to disperse the applied force when such a deformation occurs by the external force, from which the active material layer is less deformed, thereby preventing the release of the active material. The separation layer of the present disclosure may use an electrolyte layer or a separator.

The electrolyte layer serving as an ion channel may use a gel-type polymer electrolyte using PEO, PVdF, PMMA, PAN or PVAc, or a solid electrolyte using PEO, polypropylene oxide (PPO), polyethylene imine (PEI), polyethylene sulphide (PES) or polyvinyl acetate (PVAc). The matrix of the solid electrolyte preferably comprises a polymer or a ceramic glass as the backbone. In a case of typical polymer electrolytes, ions move very slowly in terms of a reaction rate, even when the ionic conductivity is satisfied. Thus, the gel-type polymer electrolyte which facilitates the movement of ions is preferably used compared to the solid electrolyte. The gel-type polymer electrolyte has poor mechanical properties and thus may comprise a porous support or a cross-linked polymer to improve the poor mechanical properties. The electrolyte layer of the present disclosure can serve as a separator, and thus the use of a separate separator may be omitted.

The electrolyte layer of the present disclosure may further comprise the lithium salt. The lithium salt can improve the ionic conductivity and reaction rate, and may use, as a non-limiting example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, and lithium tetraphenylborate.

The separator is not limited to a specific type, but may use a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer. Particularly, in order for the lithium ions from the lithium ion supplying core to be easily transferred to the outer electrode, it is preferred to use a non-woven fabric separator corresponding to a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes.

The present disclosure has a protection coating, and the protection coating corresponds to an insulator and is formed on the outer surface of the outer current collector to protect the electrodes against moisture in the air and external impacts. The protection coating may be made of a conventional polymer resin, for example, PVC, HDPE, or an epoxy resin.

Hereinafter, a cable-type secondary battery according to an exemplary embodiment and a manufacturing method thereof will be briefly explained with reference to FIG. 1.

The cable-type secondary battery 100 according to an exemplary embodiment of the present disclosure includes the lithium ion supplying core 110 comprising the electrolyte; the inner electrode support 120 of the hollow structure formed to surround the outer surface of the lithium ion supplying core 110 and the inner electrode 130 formed on the surface of the inner electrode support 120 and including the inner current collector and the inner electrode active material; the separation layer 140 formed to surround the outer surface of the inner electrode to prevent a short circuit between electrodes; and the outer electrode 150 formed to surround the outer surface of the separation layer 140 and including the outer electrode active material layer and the outer current collector.

First, the lithium ion supplying core 110 may be prepared by shaping a polymer electrolyte in a form of a wire using an extruder or the like. Also, the lithium ion supplying core 110 may be formed by providing an inner electrode support of a hollow structure and injecting a non-aqueous electrolyte solution into the center of the inner electrode support, or may be formed by providing a battery assembly having a protection coating and injecting a non-aqueous electrolyte solution into the center of an inner electrode support of a battery. Alternatively, the lithium ion supplying core 110 may be prepared by providing a wire-type carrier made of a sponge material and injecting a non-aqueous electrolyte solution therein.

Subsequently, an inner electrode is provided on the inner electrode support, and in this instance, the inner electrode is shaped as described in the foregoing and may be provided by forming an inner electrode active material layer to surround the outer surface of the inner electrode support and forming an inner current collector on the outer surface of the inner electrode active material layer, or may be provided by forming an inner current collector on the outer surface of the inner electrode support and forming an inner electrode active material layer on the outer surface of the inner current collector.

For example, first, a linear wire-type or sheet-type inner current collector is prepared and wound on the inner electrode support 120. An inner electrode active material layer is formed on the surface of the wound inner current collector by coating. As a coating method, a typical coating method may be applied, and specifically, an electroplating method or an anodic oxidation process may be used. Preferably, to maintain a regular interval, an electrode slurry containing an active material may be discontinuously applied by an extrusion-coating method using an extruder. In addition, an electrode slurry containing an active material may be applied by a dip coating method or an extrusion-coating method using an extruder. In this instance, as the inner current collector, a metal coating layer may be introduced, and the metal coating layer may be formed by an electroplating method.

Alternatively, an inner electrode active material layer may be first formed on the surface of the inner electrode support, and various types of inner current collectors may be introduced thereon.

Subsequently, the separation layer 140 comprising a polymer electrolyte layer is formed to surround the inner electrode 130. There is no special limitation on a method of forming the separation layer 140 comprising the electrolyte layer, but the use of an extrusion-coating method may ease the manufacture due to the characteristics of the cable-type secondary battery having a linear shape.

An outer electrode is formed on the outer surface of the separation layer 140, that is, the coated electrolyte, and the outer electrode may have various structures based on the placement of the outer electrode active material layer and the outer current collector as described in the foregoing.

For example, the outer electrode 150 is formed by forming an active material layer on the outer surface of the separation layer 140 by coating, and preparing an outer current collector and introducing onto the outer surface of the outer electrode active material layer.

In this instance, the coating method of the inner electrode active material layer may be equally applied to coating for the outer electrode active material layer.

In this instance, as the outer current collector, a wound wire-type current collector, a wound sheet-type current collector, a pipe-type current collector, or a mesh-type current collector may be applied.

In this instance, the outer electrode may be formed by pre-forming the outer electrode active material layer on the outer current collector and applying this onto the separation layer. For example, in a case of a wound sheet-type current collector, an outer electrode active material layer may be formed on a sheet-type current collector and cut into predetermined widths to prepare a sheet-type outer electrode. Subsequently, the sheet-type outer electrode in which the outer electrode active material layer is prepared to come in contact with the separation layer may be wound on the outer surface of the separation layer so that the outer electrode may be formed on the separation layer.

Meanwhile, when the outer electrode has a structure of including an outer current collector formed to surround the outer surface of the separation layer and an outer electrode active material layer formed to surround the outer surface of the outer current collector and come into contact with the separation layer, first, for example, a wire-type or a sheet-type outer current collector is wound on the outer surface of the separation layer. There is no special limitation on a winding method, however, for example, a wire-type outer current collector may be wound on the outer surface of the separation layer using a winding machine. Also, the outer electrode active material layer may be formed on the outer surface of the wound wire-type or sheet-type outer current collector by coating. The outer electrode active material layer may be formed to come into contact with the separation layer while surrounding the wound wire-type current collector.

Also, when the outer electrode has a structure of including the outer electrode active material layer formed to surround the outer surface of the separation layer and the outer current collector formed to be included inside the outer electrode active material layer by being covered therein and to surround the outer surface of the separation layer with spacing apart therefrom, first of all, a portion of the outer electrode active material layer intended to obtain in the end may be first formed on the outer surface of the separation layer, an outer current collector may be formed thereon to surround the outer surface of the portion of the outer electrode active material layer and an additional outer electrode active material layer may be formed on the outer current collector again to completely coat the outer current collector. In this instance, because the outer current collector is included inside the outer electrode active material layer with spacing apart from the separation layer, an electric contact between the current collector and the active material may be improved, thereby contributing to the enhancement of battery characteristics.

Finally, the protection coating 160 is formed to surround the outer surface of the electrode assembly. The protection coating 160 corresponds to an insulator and is formed on the outermost surface to protect the electrodes against moisture in the air and external impacts. As the protection coating 160, a conventional polymer resin may be used, and, for example, PVC, HDPE, or an epoxy resin may be used.

The cable-type secondary battery according to an exemplary embodiment of the present disclosure may further include an electrolyte absorption layer between the inner electrode and the separation layer.

Figure 2:
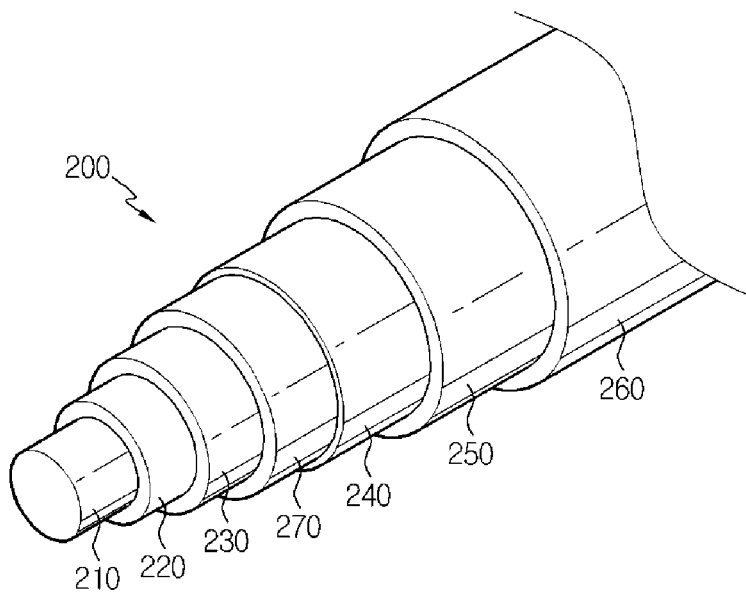
FIG. 2 is a view illustrating a cable-type secondary battery according to an exemplary embodiment of the present disclosure.

Referring to FIG. 2, an inner electrode 230 of the present disclosure is provided by forming an inner electrode active material layer and an inner current collector on the surface of an inner electrode support 220 of a hollow structure in a sequential order or vice versa to maintain an open structure, and forming an electrolyte absorption layer 270 on the surface of the inner electrode 220 again, and the electrolyte absorption layer 270 can contain an electrolyte of a lithium ion supplying core 210 and also include a lithium salt, which may facilitate the supply and exchange of lithium ions in electrodes, thereby contributing to the enhancement of battery capacity and cycle characteristics. The protection coating 260 may be formed to surround the outer surface of an outer electrode 250.

The electrolyte absorption layer is not limited to a specific type, but may use an electrolyte absorption layer made of a polymer selected from a gel-type polymer electrolyte using PEO, PVdF, PVdF-HFP, PMMA, PAN, or PVAC; and a solid electrolyte using PEO, polypropylene oxide (PPO), polyethylene imine (PEI), polyethylene sulphide (PES), or polyvinyl acetate (PVAc), and this electrolyte absorption layer may further include a lithium salt.

As a method of forming the electrolyte absorption layer, a dip coating method or an extrusion-coating method using an extruder may be used.

Also, the cable-type secondary battery according to an exemplary embodiment of the present disclosure may further include a first electrolyte absorption layer between the inner electrode and the separation layer, and a second electrolyte absorption layer between the separation layer and the outer electrode.

Figure 3:
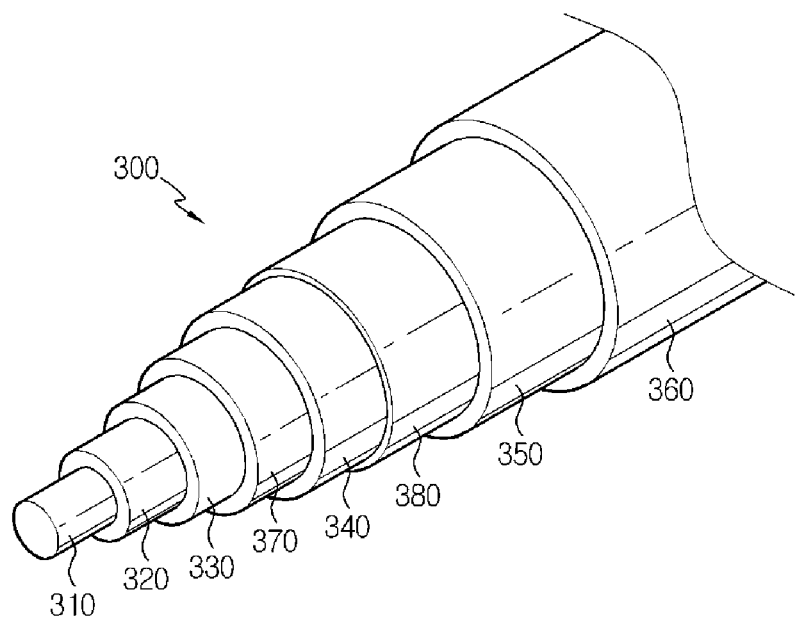
FIG. 3 is a view illustrating a cable-type secondary battery according to an exemplary embodiment of the present disclosure.

That is, referring to FIG. 3, a cable-type secondary battery 300 includes a lithium ion supplying core 310 comprising an electrolyte; an inner electrode support 320 formed to surround the outer surface of the lithium ion supplying core, an inner electrode 330 including an inner electrode active material layer and an inner current collector formed on the surface of the inner electrode support in a sequential order or vice versa, and a first electrolyte absorption layer 370 formed on the outer surface of the inner electrode; a separation layer 340 formed to surround the outer surface of the first electrolyte absorption layer to prevent a short circuit between electrodes; a second electrolyte absorption layer 380 formed on the surface of the separation layer; and an outer electrode 350 formed to surround the outer surface of the second electrolyte absorption layer and including an outer electrode active material layer and an outer current collector having various arrangements as described in the foregoing. The protection coating 360 may be formed to surround the outer surface of the outer electrode 350.

In this instance, the first electrolyte absorption layer and the second electrolyte absorption layer may be each independently formed using the same material and method as those of the electrolyte absorption layer described in the foregoing.

Accordingly, the cable-type secondary battery according to an exemplary embodiment of the present disclosure includes the electrolyte absorption layer on the outer surface of the inner electrode, or includes the first and second electrolyte absorption layers respectively on the outer surfaces of the inner electrode and the separation layer, and thus, the electrolyte of the lithium ion supplying core can be contained in the electrolyte absorption layer, thereby improving the supply and exchange of lithium ions in electrodes more effectively.

Also, in the cable-type secondary battery according to an exemplary embodiment of the present disclosure, at least one of the inner electrode and the outer electrode may correspond to a spiral electrode in which at least two wires are spirally twisted around each other.

Figure 4:
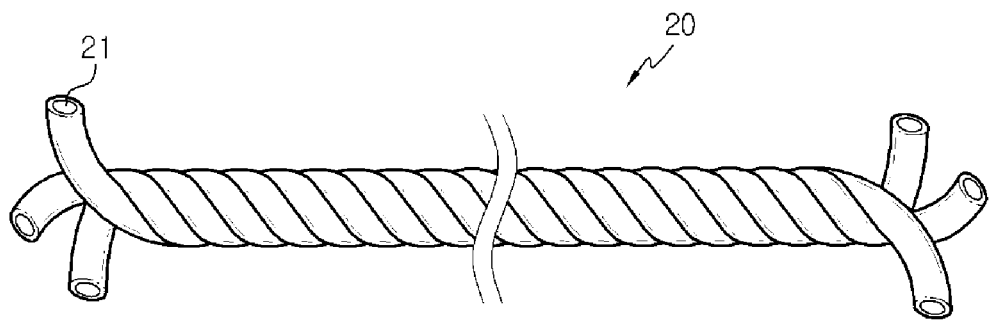
FIG. 4 is a perspective view schematically illustrating a spiral electrode provided in a cable-type secondary battery according to an exemplary embodiment of the present disclosure.
Figure 5:
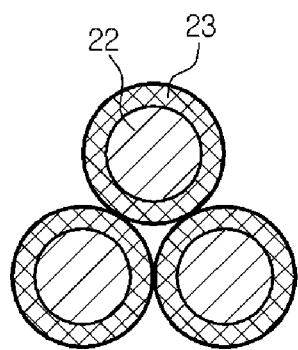
FIG. 5 is a cross sectional view of FIG. 4.

Referring to FIGS. 4 and 5, a spiral electrode 20 may include at least two wire-type current collectors 21 that are arranged in parallel to each other and spirally twisted, and the spiral electrode 20 may have an electrode active material layer 23 formed on the surface of a wire-type current collector 22 by coating.

The spiral electrode 20 includes a plurality of strands of wire-type current collectors 21 twisted spirally, and there is no special limitation on a twisted pattern, however the plurality of strands of wire-type current collectors 21 may be twisted together after being placed in parallel to each other, or the plurality of strands of wire-type current collectors 21 may be braided cross a strand over another, similar to braided hair.

Particularly, when the inner electrode corresponds to an anode, a high capacity anode material, for example, Si- or Sn-based metals or metal compounds, used as an anode active material implements electrochemical properties through an alloying/dealloying process of Li ions due to its material properties. From this, a large volume change may occur due to expansion, and if it becomes severe, the structure may collapse. As a result, an electronic contact between metal active materials fails, thereby inhibiting the transfer of Li ions into the metal layer of the anode active material to cause cycle deterioration. Also, if the anode active material layer has a high density of metals and is thick, it is difficult for Li ions to be diffused into the anode active material metal layer, thereby failing to provide sufficient capacity and good rate characteristics. However, since the spiral electrode is such that the plurality of wire-type anode current collectors coated with the anode active material layer on the surface are twisted around each other, a surface area which brings into reaction with Li ions during a charging and discharging process increases, thereby improving the battery performance. Also, the rate characteristics of the battery may be improved using a wire-type anode current collector having a thin coating of an anode active material layer. Further, a space present between the plurality of strands of wire-type anode current collectors in the spiral electrode can relieve stress or pressure applied in the battery during charging and discharging, e.g., the volume expansion of active material layers, to prevent the deformation of the battery and ensure the stability thereof, thereby increasing the life span of the battery.

The spiral electrode may have a twist rate in a range of 0.01 to 10 mm/turn. Here, the twist rate is a result of dividing a length of the spiral electrode by a number of twists, and the smaller value, the higher extent of twisting. In this instance, when the twist rate exceeds 10 mm/turn, a contact area between the wire-type current collectors is too small and an effect of increasing a surface area is insignificant, and when the twist rate is less than 0.01 mm/turn, an extent of twisting is excessively high and there is a concern about electrode damages such as peel-off of the electrode active material layer and disconnection of the current collector.

Hereinafter, another exemplary embodiment of the present disclosure will be described with reference to FIGS. 6 through 8.

Figure 6:
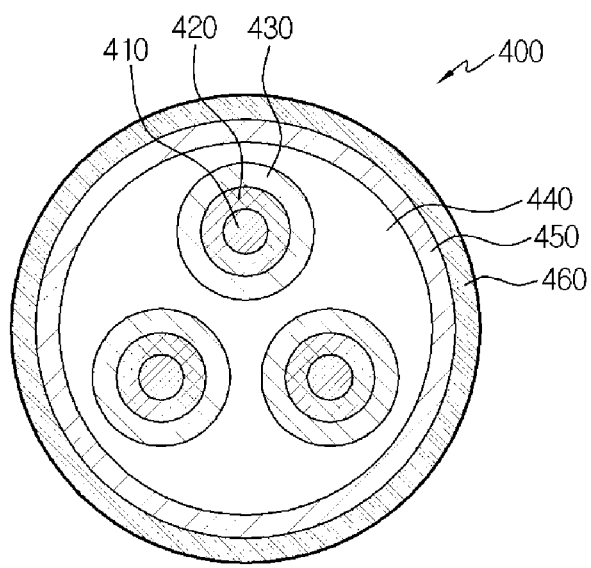
FIG. 6 is a cross sectional view illustrating a cable-type secondary battery having a plurality of inner electrodes according to an exemplary embodiment of the present disclosure.

Referring to FIG. 6, a cable-type secondary battery 400 according to an exemplary embodiment of the present disclosure includes at least two lithium ion supplying cores 410 comprising an electrolyte; an inner electrode support 420 of a hollow structure formed to surround the outer surface of each of the lithium ion supplying cores 410 and at least two inner electrodes 430 formed on the surface of the inner electrode support 420 and arranged in parallel to one another, each including an inner electrode active material layer and an inner current collector; a separation layer 440 formed to surround the outer surfaces of the inner electrodes all together to prevent a short circuit between electrodes; and an outer electrode 450 formed to surround the outer surface of the separation layer 440 and including an outer electrode active material layer and an outer current collector. Because of having the inner electrode comprising the plurality of electrodes, the cable-type secondary battery 400 may ease the balancing between an anode and a cathode and prevent a possibility of a short circuit in the presence of the plurality of electrodes. The protection coating 460 may be formed to surround the outer surface of the outer electrode 450.

Also, a cable-type secondary battery extending longitudinally according to an exemplary embodiment of the present disclosure includes at least two lithium ion supplying cores comprising an electrolyte; an inner electrode support of a hollow structure formed to surround the outer surface of each of the lithium ion supplying cores; at least two inner electrode-separation layer assemblies formed on the surface of the inner electrode support and arranged in parallel to one another, each including an inner electrode consisting of an inner current collector and an inner electrode active material layer and a separation layer formed to surround the outer surface of the inner electrode; and an outer electrode formed to surround the outer surfaces of the inner electrode-separation layer assemblies all together and including an outer electrode active material layer and an outer current collector.

Similarly, the cable-type secondary battery including the inner electrode comprising the plurality of electrodes may further include an electrolyte absorption layer between the inner electrode and the separation layer, or may include a first electrolyte absorption layer between the inner electrode and the separation layer and a second electrolyte absorption layer between the separation layer and the outer electrode, as described in the foregoing.

Figure 7:
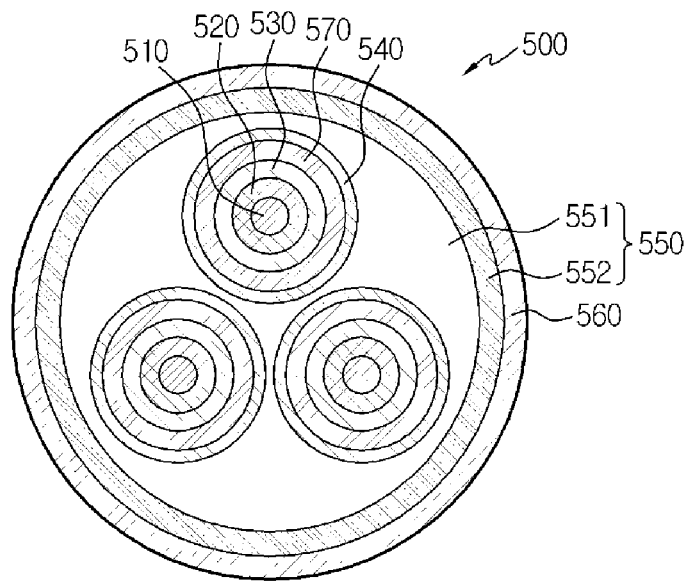
FIG. 7 is a cross sectional view illustrating a cable-type secondary battery having a plurality of inner electrodes according to an exemplary embodiment of the present disclosure.

Referring to FIG. 7, a cable-type secondary battery 500 according to an exemplary embodiment of the present disclosure includes at least two lithium ion supplying cores 510 comprising an electrolyte; an inner electrode support 520 of a hollow structure formed to surround the outer surface of each of the lithium ion supplying cores; at least two inner electrodes 530 formed on the surface of the inner electrode support 520 and arranged in parallel to one another, each including an inner electrode active material layer and an inner current collector; an electrolyte absorption layer 570 formed on the outer surface of the inner electrode; a separation layer 540 formed to surround the outer surface of the electrolyte absorption layer to prevent a short circuit between electrodes; and an outer electrode 550 including an outer electrode active material layer 551 and an outer current collector 552 formed to surround the inner electrodes having the separation layers all together. The protection coating 560 may be formed to surround the outer surface of the outer electrode 550.

Figure 8:
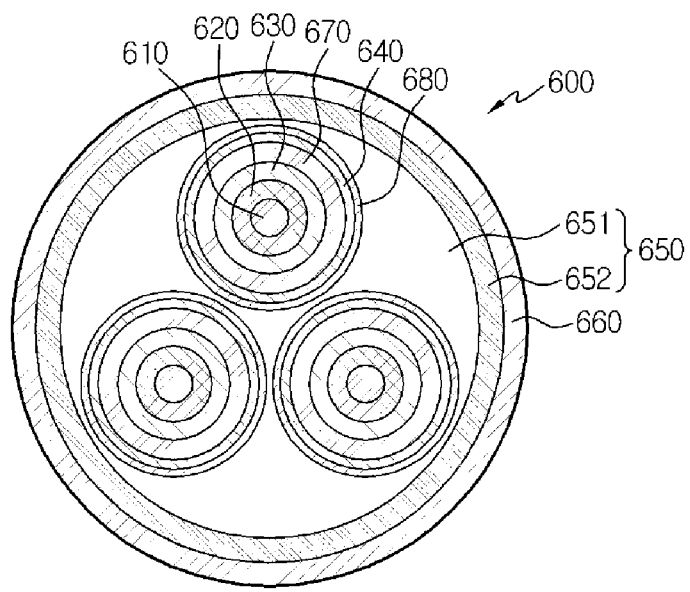
FIG. 8 is a cross sectional view illustrating a cable-type secondary battery having a plurality of inner electrodes according to an exemplary embodiment of the present disclosure.

Also, referring to FIG. 8, a cable-type secondary battery 600 according to an exemplary embodiment of the present disclosure includes at least two lithium ion supplying cores 610 comprising an electrolyte; an inner electrode support 620 of a hollow structure formed to surround the outer surface of each of the lithium ion supplying cores 610; at least two inner electrodes 630 formed on the surface of the inner electrode support 620 and arranged in parallel to one another, each including an inner electrode active material layer and an inner current collector; a first electrolyte absorption layer 670 formed on the outer surface of the inner electrode; a separation layer 640 formed to surround the outer surface of the electrolyte absorption layer to prevent a short circuit between electrodes; a second electrolyte absorption layer 680 formed on the outer surface of the separation layer; and an outer electrode 650 including an outer electrode active material layer 651 and an outer current collector 652 formed to surround the inner electrodes having the second electrolyte absorption layers all together. The protection coating 660 may be formed to surround the outer surface of the outer electrode 650.

Also, various modifications may be made to the cable-type secondary battery including at least two inner electrodes according to an exemplary embodiment of the present disclosure.

For example, the cable-type secondary battery includes at least two lithium ion supplying cores comprising an electrolyte; an inner electrode support of a hollow structure formed to surround the outer surface of each of the lithium ion supplying cores; at least two inner electrodes formed on the surface of the inner electrode support and arranged in parallel to one another, each including an inner electrode active material layer and an inner current collector; an electrolyte absorption layer formed on the outer surface of the inner electrode; and an outer electrode formed to surround the inner electrodes having the electrolyte absorption layers all together and including an outer electrode active material layer and an outer current collector.

Also, a cable-type secondary battery according to an exemplary embodiment of the present disclosure includes at least two lithium ion supplying cores comprising an electrolyte; an inner electrode support of a hollow structure formed to surround the outer surface of each of the lithium ion supplying cores; at least two inner electrodes formed on the surface of the inner electrode support and arranged in parallel to one another, each including an inner electrode active material layer and an inner current collector; a first electrolyte absorption layer formed on the outer surface of the inner electrode; a separation layer formed to surround the inner electrodes having the electrolyte absorption layers all together to prevent a short circuit between electrodes; a second electrolyte absorption layer formed on the outer surface of the separation layer; and an outer electrode formed to surround the outer surface of the second electrolyte absorption layer and including an outer electrode active material layer and an outer current collector.

Similarly, in the cable-type secondary battery including the inner electrode consisted of the plurality of electrodes, the inner electrode may include an inner electrode active material layer formed to surround the outer surface of the inner electrode support and an inner current collector formed to surround the outer surface of the inner electrode active material layer, or may include an inner current collector formed to surround the outer surface of the inner electrode support and an inner electrode active material layer formed to surround the outer surface of the inner current collector, as described in the foregoing.

Also, besides a structure of including an outer electrode active material layer formed to surround the outer surface of the separation layer and an outer current collector formed to surround the outer surface of the outer electrode active material layer, the outer electrode may have a structure of including an outer current collector formed to surround the outer surface of the separation layer and an outer electrode active material layer formed to surround the outer surface of the outer current collector and to come into contact with the separation layer, or may have a structure of including an outer electrode active material layer formed to surround the outer surface of the separation layer and an outer current collector formed to be included inside the outer electrode active material layer and to surround the outer surface of the separation layer with spacing apart therefrom.

What is claimed is:

1. A cable-type secondary battery extending longitudinally, comprising:
   a lithium ion supplying core comprising an electrolyte;
   an inner electrode support of a hollow structure formed to surround an outer surface of the lithium ion supplying core;
   an inner electrode formed on a surface of the inner electrode support, and including an inner current collector and an inner electrode active material layer;
   a separation layer formed to surround an outer surface of the inner electrode to prevent a short circuit between electrodes; and
   an outer electrode formed to surround an outer surface of the separation layer, and including an outer electrode active material layer and an outer current collector.

2. The cable-type secondary battery according to claim 1, wherein the inner electrode support of the hollow structure is a hollow fiber.

3. The cable-type secondary battery according to claim 2, wherein the hollow fiber is formed from at least one selected from the group consisting of polyethylene, polypropylene, polytetrafluoroethylene, polyvinylidenefluoride, polyimide, polyethyleneterephthalate, polyamide-imide, polyesterimide, polyethersulfone, and polysulfone.

4. The cable-type secondary battery according to claim 1, wherein the inner electrode support of the hollow structure has a pore on the surface thereof to allow the electrolyte to move to an inner electrode active material and an outer electrode active material.

5. The cable-type secondary battery according to claim 4, wherein the pore has a diameter in a range of 10 nm to 100 µm.

6. The cable-type secondary battery according to claim 1, wherein the inner current collector is a wound wire-type current collector, a wound sheet-type current collector, or a metal coating layer.

7. The cable-type secondary battery according to claim 1, wherein the inner electrode includes the inner electrode active material layer formed to surround the surface of the inner electrode support and the inner current collector formed to surround an outer surface of the inner electrode active material layer, or
   the inner electrode includes the inner current collector formed to surround the surface of the inner electrode support and the inner electrode active material layer formed to surround an outer surface of the inner current collector.

8. The cable-type secondary battery according to claim 1, wherein the outer electrode includes the outer electrode active material layer formed to surround the outer surface of the separation layer and the outer current collector formed to surround an outer surface of the outer electrode active material layer,
   the outer electrode includes the outer current collector formed to surround the outer surface of the separation layer and the outer electrode active material layer formed to surround an outer surface of the outer current collector,
   the outer electrode includes the outer current collector formed to surround the outer surface of the separation layer and the outer electrode active material layer formed to surround the outer surface of the outer current collector and to come into contact with the separation layer, or
   the outer electrode includes the outer electrode active material layer formed to surround the outer surface of the separation layer and the outer current collector formed to be included inside the outer electrode active material layer by being covered therein and to surround the outer surface of the separation layer with spacing apart therefrom.

9. The cable-type secondary battery according to claim 1, wherein the outer current collector is a pipe-type current collector, a wound wire-type current collector, a wound sheet-type current collector, or a mesh-type current collector.

10. The cable-type secondary battery according to claim 1, wherein the inner current collector is made of stainless steel; aluminum; nickel; titanium; sintered carbon; copper; stainless steel treated with carbon, nickel, titanium or silver on a surface thereof; an aluminum-cadmium alloy; a non-conductive polymer treated with a conductive material on a surface thereof; or a conductive polymer.

11. The cable-type secondary battery according to claim 10, wherein the conductive material is any one selected from polyacetylene, polyaniline, polypyrrole, polythiophene, polysulfurnitride, indium tin oxide (ITO), silver, palladium, and nickel, or mixtures thereof.

12. The cable-type secondary battery according to claim 10, wherein the conductive polymer is a polymer of any one compound selected from polyacetylene, polyaniline, polypyrrole, polythiophene, and polysulfurnitride, or mixtures thereof.

13. The cable-type secondary battery according to claim 1, wherein the outer current collector is made of stainless steel; aluminum; nickel; titanium; sintered carbon; copper; stainless steel treated with carbon, nickel, titanium or silver on a surface thereof; an aluminum-cadmium alloy; a non-conductive polymer treated with a conductive material on a surface thereof; a conductive polymer; a metal paste comprising metal powders of Ni, Al, Au, Ag, Al, Pd/Ag, Cr, Ta, Cu, Ba or ITO; or a carbon paste comprising carbon powders of graphite, carbon black or carbon nanotube.

14. The cable-type secondary battery according to claim 1, wherein the electrolyte comprises an electrolyte selected from a non-aqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP); and a gel-type polymer electrolyte using PEO, PVdF, PMMA, PAN or PVAC; and a solid electrolyte using PEO, polypropylene oxide (PPO), polyethylene imine (PEI), polyethylene sulphide (PES), or polyvinyl acetate (PVAc).

15. The cable-type secondary battery according to claim 1, wherein the electrolyte further comprises a lithium salt.

16. The cable-type secondary battery according to claim 15, wherein the lithium salt is any one selected from LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, and lithium tetraphenylborate, or mixtures thereof.

17. The cable-type secondary battery according to claim 1, wherein the inner electrode is an anode or a cathode, and the outer electrode is a cathode or an anode, opposite to the inner electrode.

18. The cable-type secondary battery according to claim 1, wherein when the inner electrode is an anode and the outer electrode is a cathode,
the inner electrode active material layer comprises particles of any one active material selected from the group consisting of natural graphite, artificial graphite, or a carbonaceous material; lithium-containing titanium composite oxide (LTO), and metals (Me) including Si, Sn, Li, Zn, Mg, Cd, Ce, Ni and Fe; alloys of the metals (Me); oxides (MeOx) of the metals (Me); and composites of the metals (Me) and carbon, or mixtures thereof, and
the outer electrode active material layer comprises particles of any one active material selected from the group consisting of LiCoO$_2$, LiNiO$_2$, LiMn$_2$O$_4$, LiCoPO$_4$, LiFePO$_4$, LiNiMnCoO$_2$, and LiNi$_{1-x-y-z}$Co$_x$M1$_y$M2$_z$O$_2$ (wherein each of M1 and M2 is, independently, any one selected from the group consisting of Al, Ni, Co, Fe, Mn, V, Cr, Ti, W, Ta, Mg and Mo, and x, y and z are, independently, atomic fractions of elements in an oxide composition, in which 0≤x<0.5, 0≤y<0.5, 0≤z<0.5, and x+y+z≤1), or mixtures thereof.

19. The cable-type secondary battery according to claim 1, wherein when the inner electrode is a cathode and the outer electrode is an anode,
the inner electrode active material layer comprises particles of any one active material selected from the group consisting of LiCoO$_2$, LiNiO$_2$, LiMn$_2$O$_4$, LiCoPO$_4$, LiFePO$_4$, LiNiMnCoO$_2$, and LiNi$_{1-x-y-z}$Co$_x$M1$_y$M2$_z$O$_2$ (wherein each of M1 and M2 is, independently, any one selected from the group consisting of Al, Ni, Co, Fe, Mn, V, Cr, Ti, W, Ta, Mg and Mo, and x, y and z are, independently, atomic fractions of elements in an oxide composition, in which 0≤x<0.5, 0≤y<0.5, 0≤z<0.5, and x+y+z≤1), or mixtures thereof, and
the outer electrode active material layer comprises particles of any one active material selected from the group consisting of natural graphite, artificial graphite, or a carbonaceous material; lithium-containing titanium composite oxide (LTO), and metals (Me) including Si, Sn, Li, Zn, Mg, Cd, Ce, Ni and Fe; alloys of the metals (Me); oxides (MeOx) of the metals(Me); and composites of the metals (Me) and carbon, or mixtures thereof.

20. The cable-type secondary battery according to claim 1, wherein the separation layer is an electrolyte layer or a separator.

21. The cable-type secondary battery according to claim 20, wherein the electrolyte layer comprises an electrolyte selected from a gel-type polymer electrolyte using PEO, PVdF, PMMA, PAN or PVAC; and a solid electrolyte using PEO, polypropylene oxide (PPO), polyethylene imine (PEI), polyethylene sulphide (PES), or polyvinyl acetate (PVAc).

22. The cable-type secondary battery according to claim 20, wherein the electrolyte layer further comprises a lithium salt.

23. The cable-type secondary battery according to claim 22, wherein the lithium salt is any one selected from LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, and lithium tetraphenylborate, or mixtures thereof.

24. The cable-type secondary battery according to claim 20, wherein the separator is a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer.

25. The cable-type secondary battery according to claim 1, further comprising:
an electrolyte absorption layer between the inner electrode and the separation layer.

26. The cable-type secondary battery according to claim 1, further comprising:
a first electrolyte absorption layer between the inner electrode and the separation layer; and
a second electrolyte absorption layer between the separation layer and the outer electrode.

27. The cable-type secondary battery according to claim 1, wherein at least one of the inner electrode and the outer electrode is a spiral electrode in which at least two wires are spirally twisted around each other.

28. The cable-type secondary battery according to claim 1, wherein the cable-type secondary battery has a cross section of a circular or polygonal shape.

29. A cable-type secondary battery extending longitudinally, comprising:
at least two lithium ion supplying cores comprising an electrolyte;
an inner electrode support of a hollow structure formed to surround an outer surface of each of the at least two lithium ion supplying cores;
at least two inner electrodes formed on a surface of the inner electrode support and arranged in parallel to one another, each including an inner current collector and an inner electrode active material layer;
a separation layer formed to surround outer surfaces of the at least two inner electrodes all together to prevent a short circuit between electrodes; and
an outer electrode formed to surround an outer surface of the separation layer, and including an outer electrode active material layer and an outer current collector.

30. The cable-type secondary battery according to claim 29, further comprising:
an electrolyte absorption layer on the outer surfaces of the at least two inner electrodes.

31. The cable-type secondary battery according to claim 29, further comprising:
a first electrolyte absorption layer on the outer surfaces of the at least two inner electrodes; and
a second electrolyte absorption layer on the outer surface of the separation layer.

32. The cable-type secondary battery according to claim 29, wherein at least one of the at least two inner electrodes and the outer electrode is a spiral electrode in which at least two wires are spirally twisted around each other.

33. A cable-type secondary battery extending longitudinally, comprising:
at least two lithium ion supplying cores comprising an electrolyte;
an inner electrode support of a hollow structure formed to surround an outer surface of each of the at least two lithium ion supplying cores;
at least two inner electrode-separation layer assemblies formed on a surface of the inner electrode support and arranged in parallel to one another, each including an inner electrode having an inner current collector and an inner electrode active material layer and a separation layer formed to surround an outer surface of the inner electrode; and
an outer electrode formed to surround outer surfaces of the at least two inner electrode-separation layer assemblies all together, and including an outer electrode active material layer and an outer current collector.

34. A cable-type secondary battery extending longitudinally, comprising:
at least two lithium ion supplying cores comprising an electrolyte;
an inner electrode support of a hollow structure formed to surround an outer surface of each of the at least two lithium ion supplying cores;
at least two inner electrodes formed on a surface of the inner electrode support and arranged in parallel to one another, each including an inner electrode active material layer and an inner current collector;
an electrolyte absorption layer formed on an outer surface of each of the at least two inner electrodes;
a separation layer formed to surround the at least two inner electrodes having the electrolyte absorption layers all together to prevent a short circuit between electrodes; and
an outer electrode formed to surround an outer surface of the separation layer all together, and including an outer electrode active material layer and an outer current collector.

35. A cable-type secondary battery extending longitudinally, comprising:
at least two lithium ion supplying cores comprising an electrolyte;
an inner electrode support of a hollow structure formed to surround an outer surface of each of the at least two lithium ion supplying cores;
at least two inner electrodes formed on a surface of the inner electrode support and arranged in parallel to one another, each including an inner electrode active material layer and an inner current collector;
at least two electrolyte absorption layers each formed on an outer surface of the at least two inner electrodes; and
an outer electrode formed to surround the at least two inner electrodes having the at least two electrolyte absorption layers all together, and including an outer electrode active material layer and an outer current collector.

36. A cable-type secondary battery extending longitudinally, comprising:
at least two lithium ion supplying cores comprising an electrolyte;
an inner electrode support of a hollow structure formed to surround an outer surface of each of the at least two lithium ion supplying cores;
at least two inner electrodes formed on a surface of the inner electrode support and arranged in parallel to one another, each including an inner electrode active material layer and an inner current collector;
a first electrolyte absorption layer formed on an outer surface of each of the at least two inner electrodes;
a separation layer formed to surround the at least two inner electrodes having the first electrolyte absorption layers all together to prevent a short circuit between electrodes;
a second electrolyte absorption layer formed on an outer surface of the separation layer; and
an outer electrode formed to surround an outer surface of the second electrolyte absorption layer, and including an outer electrode active material layer and an outer current collector.

* * * * *